United States Patent [19]

Tennis

[11] E Re. 29,292

[45] Reissued July 5, 1977

[54] CONTROL VALVE MEANS FOR FLUID MOTORS

[75] Inventor: Francis H. Tennis, Oconomowoc, Wis.

[73] Assignee: Sundstrand Corporation, Rockford, Ill.

[22] Filed: Apr. 21, 1975

[21] Appl. No.: 570,119

Related U.S. Patent Documents

Reissue of:

[64] Patent No.: 3,730,219
Issued: May 1, 1973
Appl. No.: 145,137
Filed: May 20, 1971

[52] U.S. Cl. ..... 137/596; 91/420; 91/447; 137/106; 137/596.1

[51] Int. Cl.² ..... F15B 13/04

[58] Field of Search ..... 137/596, 596.2, 596.12, 137/596.13, 596.1, 106, 115, 504; 91/421, 447, 445, 420

[56] References Cited

UNITED STATES PATENTS

| | | | |
|---|---|---|---|
| 2,501,483 | 3/1950 | Taylor | 91/421 |
| 2,881,794 | 4/1959 | Baldwin et al. | 137/501 |
| 3,285,282 | 11/1966 | Martin | 137/596 |
| 3,338,263 | 8/1967 | Altmeppen et al. | 137/494 X |
| 3,398,650 | 8/1968 | Garnjost | 91/421 |
| 3,439,583 | 4/1969 | Stacey | 137/596.2 X |
| 3,524,386 | 8/1970 | Cudnohufsky | 137/501 X |
| 3,532,119 | 10/1970 | Lind | 137/596 |
| 3,570,517 | 3/1971 | Odenthal | 91/447 X |
| 3,613,711 | 10/1971 | Wilke | 137/115 |
| 3,730,206 | 5/1973 | Sirek | 137/87 |
| 3,759,288 | 9/1973 | Kubashi | 137/504 X |

*Primary Examiner*—Alan Cohan
*Assistant Examiner*—Gerald A. Michalsky
*Attorney, Agent, or Firm*—Ira Milton Jones

[57] ABSTRACT

A pressure reducing valve mechanism maintains pressure in one of the service passages of a control valve at a desirably low value except at times when the control valve element is actuated to a position effecting flow of pressurized supply fluid to said service passage for delivery to a motor governed by the control valve.

11 Claims, 3 Drawing Figures

INVENTOR
Francis H. Tennis
BY [signature]
ATTORNEY

INVENTOR
Francis H. Tennis
By [illegible]
ATTORNEY

CONTROL VALVE MEANS FOR FLUID MOTORS

Matter enclosed in heavy brackets [ ] appears in the original patent but forms no part of this reissue specification; matter printed in italics indicates the additions made by reissue.

BACKGROUND OF THE INVENTION

This invention relates to control valves for governing the operation of fluid motors, and it has more particular reference to valve instrumentalities by which the speed of motor operation can be closely controlled despite load influences which tend to drive the motor at rates faster than desired.

The tendency for fluid motors such as hydraulic cylinders to be driven by the load thereon is well known. The booms of backhoes and front end loaders, for example, constitute heavy loads which are customarily raised and lowered by hydraulic cylinders at the dictate of control valves therefor. During lowering of such a boom, the control valve for its cylinder directs pressure fluid from a pump into one end of the cylinder and conducts fluid expelled from the other end thereto to the reservoir line of the system. The boom aided by gravity, tends to descend rapidly at an accelerating and uncontrolled rate, and the boom usually attains a speed such that the expanding end of its cylinder cannot be kept filled with fluid from the pump. When that occurs, a void is drawn in the expanding end of the cylinder, and positive control over the boom is lost until its cylinder is refilled with fluid.

In situations where the load is swingable from side to side, as is the case with the boom of a backhoe, the load can actually drive the cylinder in each direction. This makes it extremely difficult to control the speed with which the boom is swung, and positive control over the boom at all times cannot be had.

Elaborate and costly throttling schemes have been proposed in the past in an effort to achieve controlled movement of heavy loads by their hydraulic cylinders. This invention provides an exceptionally simple and low cost solution to that problem.

SUMMARY OF THE INVENTION

It is the primary object of this invention to provide a control valve instrumentality for a fluid motor, wherein exceptionally good control over the speed of motor operation is achieved by means which comprises fluid pressure responsive mechanism to effectively throttle the flow of motor return fluid in one or in both service passages of the valve.

More specifically, it is an object of the invention to so combine with a more or less conventional control valve a fluid pressure responsive exhaust throttline device which can comprise a simple pressure reducing valve mechanism for one or for both service passages of the control valve to maintain pressure therein at a substantially uniformly low value above that of fluid in the return passages of the control valve.

It is also a purpose of the invention to provide fluid motor control instrumentalities such as described in the preceding object with means to render the pressure reducing valve mechanism or mechanisms ineffective at times when pressure fluid is being directed to the service passage associated therewith for flow to the governed motor.

A further objective of the invention is to so combine a pressure reducing valve mechanism with a control valve for a fluid motor as to minimize leakage of fluid past the control spool of the valve to the return passages thereof from one or both of its service passages in the neutral position of the control valve element.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof, and in which.

Figure 1:
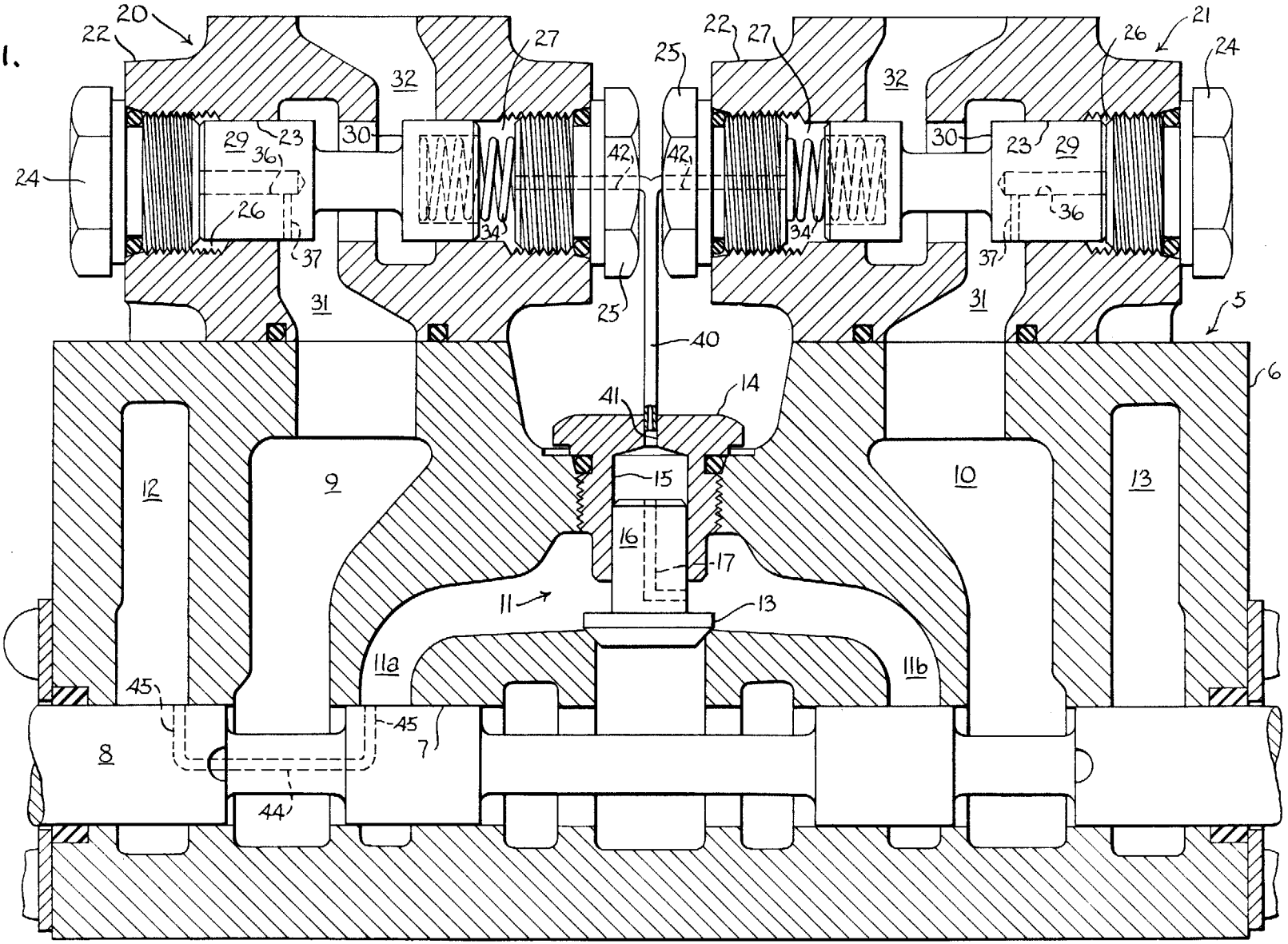
FIG. 1 is a sectional view of a hydraulic control valve embodying this invention.

Referring now to the accompanying drawings, the numeral 5 generally designates a hydraulic control valve of more or less conventional construction except as to features to be described hereinafter. The control valve comprises a body 6 having a bore 7 therein and a valve spool 8 slidable axially in the bore. The spool can be shifted in either direction from the neutral or hold position thereof seen in FIG. 1 to a pair of operating positions, one of which is seen in FIG. 2, to connect either of a pair of service passages 9 and 10 of the valve with the pressure fluid inlet thereof (not shown) through what can be termed a high pressure supply or bridge passage 11, and to concurrently connect the other service passage with a reservoir port (not shown) through an exhaust passage adjacent thereto.

In the valve shown, the exhaust passages 12 and 13, open to the bore at widely spaced locations along its length. The bridge passage 11 is U-shaped, and has legs 11a and 11b which open to the bore 7 at zones spaced axially inwardly from the junctions between the exhaust passages and the bore. Each service passage connects with the bore at a zone between one of the exhaust passages and the leg of the bridge passage adjacent thereto.

In either operating position of the control valve spool [9] *8*, pressure fluid from the valve inlet is diverted into the high pressure bridge passage 11 through a load holding check valve 13 in a conventional way. It should be noted, however, that the check valve is held in place in the valve body by means of a threaded plug 14 which extends down into the body and has a well 15 therein opening to the bridge passage. A stem 16 on the check valve projects up into the well 15 to be guided thereby for opening and closing motion axially of the well. As is customary, the check valve stem has an angled passageway 17 therein to communicate the inner portion of the well 15 with the bridge passage and thus enable fluid to be readily expelled to the latter during opening motion of the check valve. A light spring (not shown) is ordinarily accommodated in the well to yieldingly urge the check valve toward closed position.

Mounted on the body 6 of the control valve directly over the mouths of its service passages 9 and 10, are pressure reducing valve mechanism 20 and 21, respectively. Since the pressure reducing valve mechanisms are identical, a description of the left hand mechanism 20 will suffice for both.

The pressure reducing valve mechanism 20 comprises a body 22 having a bore 23 therethrough, closed at its opposite ends by means of plugs 24 and 25. Those portions of the bore which are axially inwardly adjacent to the plugs 24 and 25 provide chambers 26 and 27, respectively. Slidably mounted in the bore 23 with its opposite end portions received in the chambers 26 and 27 is a fluid pressure sensitive plunger 29 having a circumferential groove 30 therein intermediate its ends to normally provide communication through the bore 23 between two branches 31 and 32 of a passageway that forms a continuation of the associated service passage 9. The branch 31 communicates directly with service passage 9 and with the bore 23 at a location spaced axially a short distance from the junction of the other branch 32 with said bore. Hence, the service passage 9 and the two branches 31 and 32 of the passageway in the pressure reducing valve mechanism constitute continuous portions of a service line through which pressure fluid can flow to and from a fluid motor.

A spring 34 confined between the plug 25 and an adjacent end portion of the plunger 29 urges the latter toward a normal or inactive position defined by the plug 24. In this normal position of the plunger, its circumferential groove 30 spans the junctions between the bore and both passage branches 31 and 32 and thus communicates the branch 32 with the associated service passage 9.

The chamber 26 at the left hand end of the plunger 29 is communicated with the branch passage 31 and hence with the service passage 9 by means of a passageway in the plunger. That passageway has an axial branch 36 which opens to the chamber 26 and a radial branch 37 which opens to the branch passage 31 and at all times communicates with the service passage 9. Accordingly, the chamber 26 will contain fluid at a pressure corresponding to that in the service passage 9.

The chamber 27 at the other end of the plunger 29 is vented so that the plunger can move to the right in response to pressure of fluid in chamber 26. Chamber 27 can be communicated in any desired fashion with the reservoir of a system of which the control valve forms a part, or it can be vented to the bridge passage [10] *11* in the interior of the control valve body 6 as by means of a vent line 40 shown diagrammatically as connecting with the plugs 14 and 25 in communication with axial ports 41 and 42, respectively, in said plugs. The vent line 40 thus serves to communicate the chamber 27 with the well in the interior of the plug 14, and with the high pressure bridge 11 through the angled passage 17 in check valve 13.

One of the features of this invention resides in providing the control spool 8 with a passageway 44 having axially spaced radial branches 45 to communicate one leg 11a of the high pressure bridge passage 11 with the return passage 12 in the neutral or hold position of the control valve spool 8. By such venting of the bridge passage, the chamber 27 of the pressure reducing valve mechanism is also vented in the hold position of the valve spool 8, and the plunger 29 can respond to load pressurized fluid in the chamber 26 and be actuated to the right thereby and thus effect reduction of pressure in the service passage 9 to a value determined by the force of the spring 34 opposing such response of the plunger.

Thus, with a 200 p.s.i. spring, for example, the pressure reducing valve mechanism will function to reduce pressure to about 200 p.s.i. in the service passage 9, whereas the pressure therein might otherwise reach a value as high as 3,000 p.s.i. if the governed cylinder is heavily loaded. Consequently, with zero pressure in the adjacent exhaust passage 12, the leakage of fluid thereto along the wall of the spool receiving bore 7 from the service passage 9 when such reduced pressure obtains in the latter could be as much as one-fifteenth [less than] *of* the leakage that would occur if a non-reduced pressure of 3,000 p.s.i. were allowed to remain in the service passage in the hold position of the valve spool 8. In other words, the leakage would be far greater with a 3,000 p.s.i. pressure differential between the exhaust passage 12 and service passage 9 than it is with only a 200 p.s.i. pressure differential between said passages.

The pressure reducing valve mechanism 20 will maintain this desirably low pressure differential between passages 9 and 12 in the neutral position of the valve spool 8 as long as seepage past the left hand land of plunger 29 to the service passage 9 is no greater than the leakage from service passage 9 to the adjacent exhaust passage 12 across the control valve spool 8. [This can normally be taken care of] *Since plunger clearance in its bore and wall area of the latter engaged by the left hand land on the plunger are factors that determine the amount of fluid at a given pressure that will seep past the plunger in neutral, it is obvious that such seepage can be reduced to a very low level either by minimizing plunger clearance, or* by assuring adequate land length along the wall of the bore 23 between its junctions with passage branches 31 and 32 [.] *for encircling engagement with the left hand land of the plunger in what can be considered its closed position. It will also be obvious that plunger clearance in its bore need not be critical if its left hand land were enlarged and formed like a poppet, with a conical surface to engage a similarly surfaced seat formed in that portion of the bore between passage branches 31 and 32.*

It will thus be seen that the pressure reducing valve mechanism will function to minimize leakage of pressure fluid from either service passage to the adjacent exhaust passage, past the control valve spool 8 in the neutral or hold position of the latter.

The control valve spool 8 is shown in an operating position in FIG. 2 which, for the sake of discussion, can be considered as permitting pressure fluid to exhaust to passage 12 from a single acting hydraulic cylinder, via service passage 9. The valve spool has not been moved to a full operating position to the left of neutral, but is in a partial operating position at which it meters flow of exhaust fluid to the return passage 12. This situation represents the heretofore commonly accepted way of governing the speed of motor operation, in this case, the rate at which the load on the cylinder is allowed to descend.

If the load on the governed cylinder is a heavy one that tends to descend at an increasing rate, exhaust fluid will be forced through the metering orifice set up by the control valve spool at correspondingly faster rates. Under such conditions, the valve spool 8 can only effect throttling over a very narrow range, through the metering notches ordinarily provided in the spool lands governing exhaust flow.

This problem is solved by the pressure reducing valve mechanism 20 for service passage 9. Again let it be assumed that the spring 34 exerts a 200 p.s.i. force upon the plunger 29 tending to hold it in its wide open or inactive position allowing free flow of fluid to service passage 9 from branch passage 32. The plunger 29 will then respond to increase in pressure in service passage 9 to a value about 200 p.s.i. and be moved to the right by such pressure in chamber 26, toward a closed position restricting communication between passage branch 32 and the service passage 9 whatever extent is necessary to restore the desired 200 p.s.i. differential in the pressures of fluid in the service passage 9 and in the adjacent exhaust passage 12. Any tendency for increase in pressure in service passage 9 due to the tendency for the load on the governed cylinder to descend at an accelerating rate will thus be manifested in further automatic adjustment of the plunger 29 in the passage closing direction, to keep the pressure in service passage 9 at a constant low value predetermined by the strength of spring 34.

Other advantages result from the use of the pressure reducing valve mechanisms described. For example, with only a 200 p.s.i. pressure differential between passages 9 and 12, the axial jet forces reacting upon the valve spool as the result of high speed fluid flow past the spool to the exhaust passage are dramatically reduced. Equally as significant, however, is the fact that the range of spool throttling movement is greatly increased.

While the pressure reducing valve mechanism 20 thus serves to improve the throttling action and regulation of the speed of descent of a single acting cylinder, (or of the speed of rotation of a rotary fluid motor supplied with pressure fluid from the other service passage [13] *)10,* it should not interfere with flow of pump fluid to a cylinder or other motor when the valve spool 8 is actuated to an operating position communicating the service passage 9 with the adjacent leg of the high pressure bridge passage 11, and the load is to be raised. For that purpose, the vent line 40 which connects the spring chamber 27 of the pressure reducing valve mechanism with the high pressure bridge passage 11 also serves to render the plunger 29 non-responsive to the high pressure of pump fluid flowing through the service passage 9 to the cylinder. This results from the fact that fluid in spring chamber 27 will then be maintained at the same high pressure as obtains in the bridge passage 11, and the plunger 29 will be held thereby in its wide open limit of motion defined by its engagement with plug 24.

Figure 2:
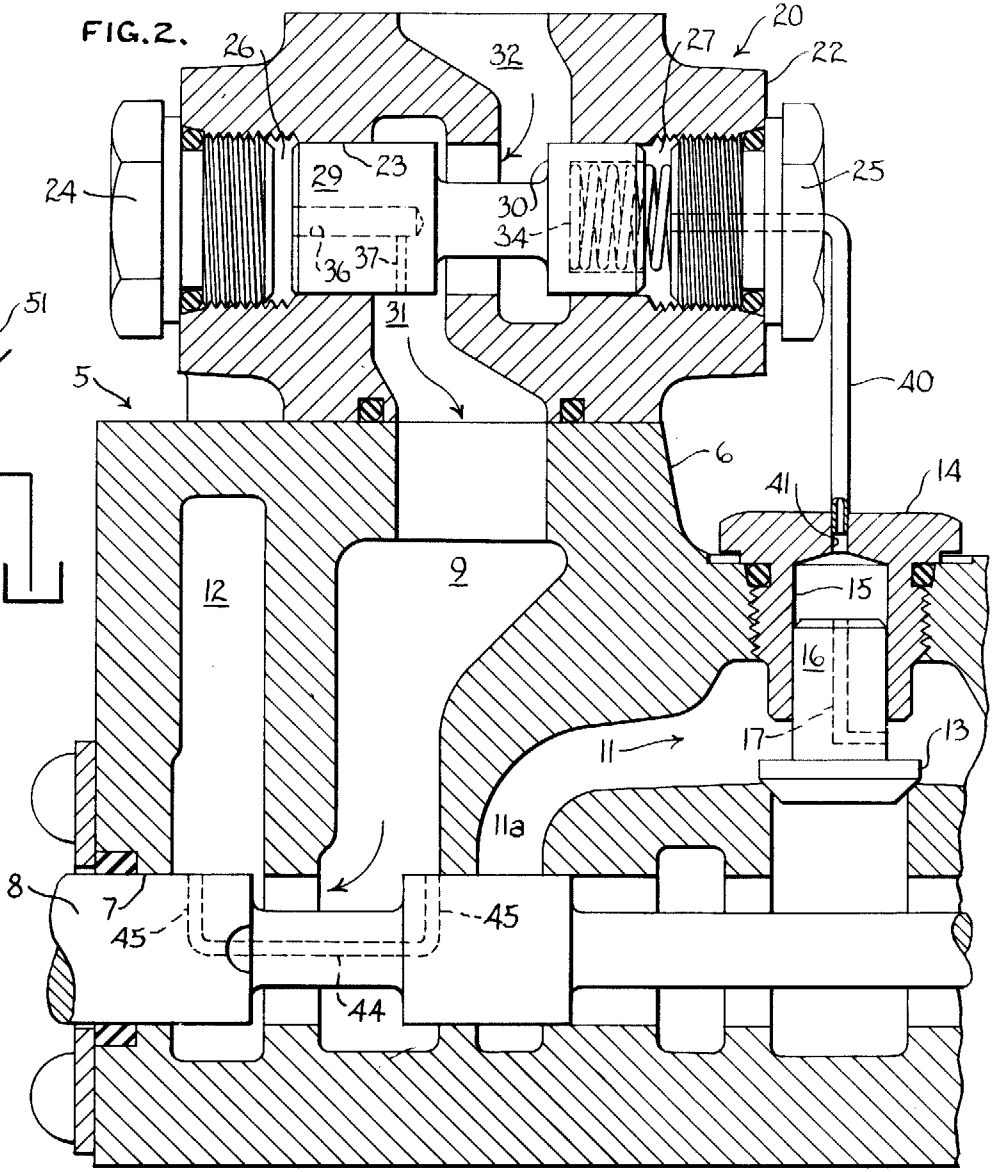
FIG. 2 is a fragmentary sectional view corresponding to the left hand portion of FIG. 1 but showing an operating position of the control valve spool.

Pressure reducing valve mechanisms 20 and 21, such as seen in FIG. 1, are useful for both service passages of a control valve governing the operation of reversible fluid motors such as double acting hydraulic cylinders. The operation of the pressure reducing valve 21, of course, is the same as that of the pressure reducing valve mechanism 20 described above. It will function to maintain a desirably low pressure in service passage [13] *10* in the neutral position of valve spool 8 as well as when the spool is in a position communicating service passage 10 with the adjacent branch 13 of the exhaust passage; but its vent line connection with the bridge passage 11 renders it ineffective at times when its associated service passage 10 is communicated with the leg 11b of the bridge passage by the control valve spool.

Another important feature of the invention which results from venting the chambers 27 of the two pressure reducing valves 20 and 21 to the high pressure bridge or supply passage 11 of the control valve, is that this expedient permits the pressure reducing valves to achieve a counter balancing or flow coordinating function such as is ordinarily possible only with far more sophisticated counterbalance valve mechanisms.

For example, let it be assumed that the control spool 8 is in a left hand operating position directing pump fluid from the supply bridge 11 to service passage 10 for flow to one end of a hydraulic cylinder while providing for return flow of fluid from the other end of the cylinder to exhaust passage 12 through service passage 9 and the pressure reducing valve 20 therefor. At that time, the pressure of supply fluid is manifested in the spring chambers 27 of both pressure reducing valves through the venting lines 40, 41 and 42 and the angled passage 17 in load check 13. Hence, the pressure will immediately rise in the supply bridge 11 if and when the plunger of valve 20 occupies a restricting position at which it will not allow flow of fluid out of the exhausting end of the governed cylinder at a high enough rate to match the flow of pump fluid into its other end. Such rise in pressure, of course, is also manifested in the chambers 27 of both pressure reducing valves 20 and 21. As a result, the pressures in the chambers 26 and 27 of valve 21 will be in balance at the increased pressure and the spring 34 thereof will hold the valve plunger in its open position; but the increased pressure in the spring chamber 27 of the pressure reducing valve 20 on the return side will cause the plunger thereof to be moved in the valve opening or flow coordinating direction to allow exhaust flow from the governed cylinder as fast as pump fluid is allowed to flow thereinto in any given setting of the control spool 8.

Figure 3:
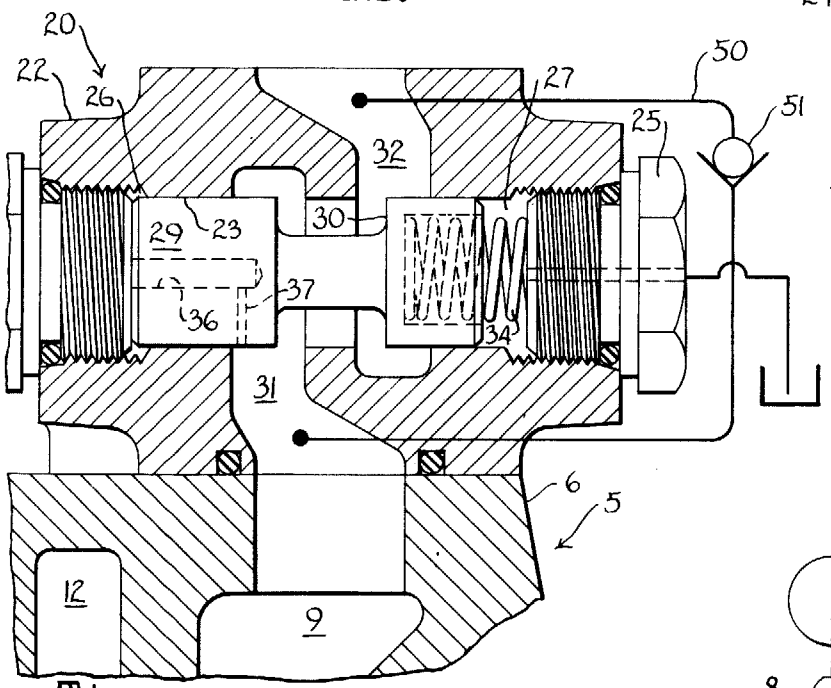
FIG. 3 is a fragmentary sectional view corresponding to a portion of FIG. 1 but showing a modified embodiment of the invention.

FIG. 3 shows another way of assuring flow of high pressure fluid from the pump out through either service passage 9 or 10 of the control valve to a fluid motor governed thereby, without interference from the associated pressure reducing valve mechanism, at times when the spring chambers 27 thereof are vented to a reservoir or to the opposite service passage 10, instead of to the bridge passage 11. As diagrammatically seen in FIG. 3, a check valve controlled bypass line 50 can then be provided to connect the branch passages 31 and 32, in bypass relation to the plunger 29. The check valve 51 in the bypass line is oriented to permit pressure fluid to flow substantially free from the branch passage 31 to the branch passage 32, regardless of the position of the plunger 29 of the pressure reducing valve mechanism, while precluding reverse flow through the bypass line.

As will be appreciated, the bypass line 50 and its check valve 51 can be incorporated in the body of the pressure reducing valve mechanism if desired. Similarly, the pressure reducing valve mechanisms can be incorporated in the body 6 of the control valve, or secured thereto by screws, whichever is preferred.

From the foregoing description, together with the accompanying drawings, it will be readily apparent to those skilled in the art that this invention provides an exceptionally simple but efficacious way of utilizing pressure reducing valve mechanisms to help govern the speed at which fluid motors are operated by their control valves.

The invention is defined by the following claims:

[1. Valve instrumentalities for governing operation of a fluid motor, characterized by:

A. a control valve having a pair of service passages for connection with the opposite sides of a fluid motor, and a valve element movable through a number of metering positions to full flow operating positions concurrently communicating either of the service passages with pressure fluid supply means and the other service passage with fluid return means in the valve, from a hold position closing off said service passages from the fluid supply and return means;

B. a pressure reducing valve mechanism for each service passge, having a passageway through which exhaust fluid from the governed motor flows to the fluid return means through the associated service passage in one of said full flow operating positions of the valve element, and a pressure responsive valve member actuatable in a passageway restricting direction whenever the pressure of exhaust fluid in the associated service passage is caused to exceed that of fluid in the return means by a substantially small amount as a result of the valve element occupying one of said metering position, to thereby maintain the pressure of exhaust fluid in the associated service passage at a substantially uniformly low value above that of fluid in the return means;

C. and means cooperable with each pressure reducing valve mechanism and rendered operative in response to pressure of fluid in said pressure fluid supply means for effecting flow of such supply fluid through the associated service passage to the governed motor substantially without interference from said pressure reducing valve mechanism.]

[2. The combination of claim 1, wherein said last named means comprises a chamber communicated with the pressure fluid supply passage means, and a plunger which is connected with said valve member and which operates in said chamber to be held by pressure of supply fluid therein in a position blocking movement of said valve member toward a passageway restricting position.]

[3. In combination with a control valve for a fluid motor, having a valve element movable to a first position to communicate a service passage with supply passage means, and movable to a second position to provide for flow of motor exhaust fluid through the service passage to return passage means, said control valve element being movable through a range of metering positions short of said second position thereof to provide for restricted flow of motor exhaust fluid from the service passage to the return passage means in an amount which increases as the valve element approaches its said second position:

A. a pressure reducing valve mechanism having 1. a passageway connecting with the service passage and through which pressure fluid flows both to and from the governed motor.

2. a valve member actuatable in one direction to restrict flow of motor exhaust fluid through said passageway.

3. and a spring to yieldingly urge the valve member toward an inactive position affording substantially free flow of motor exhaust fluid through said passageway;

B. means rendered operative in response to the rise in service passage pressure produced by movement of the control valve element to one of its said exhaust flow metering positions for effecting actuation of the pressure reducing valve member in the flow restricting direction an extent depending upon the magnitude of the pressure present in the service passage;

C. and means rendered operative in response to the pressure of supply fluid flowing to the service passage in said first position of the control valve element, for effecting flow of such supply fluid through said passageway and to the governed motor substantially without interference from the pressure reducing valve member.]

4. The combination of claim 3, further characterized by:

[A. said control valve element being movable to a load holding third position to close off the service passage from the fluid supply and return passage means:

B. and said pressure reducing valve mechanism also being operable to maintain the pressure in the service passage at said low value in said load holding position of the valve element.]

[5. The combination of claim 3, wherein said last named means comprises:

A. means connected with the service passage providing a bypass around the pressure reducing valve mechanism, through which pressure fluid can flow to the governed motor in said first position of the valve element;

B. and a check valve in said bypass to block reverse flow of fluid through the bypass.]

[6. Valve instrumentalities for governing flow of pressure fluid to and from a fluid motor via a service line connectable therewith, characterized by:

A. a directional control valve having fluid supply and return passage means, a service passage for connection with the service line to form a part thereof, and a valve element movable from a hold position to first and second operating positions to respectively communicate the service passage with the fluid supply and return passage means, said valve element being movable through a range of metering positions to provide for return flow of motor exhaust fluid from the service passage to the return passage means in an amount which increases with movement of the valve element toward said second position thereof and reaches maximum thereat;

B. a pressure reducing valve mechanism having a valve member to regulate flow of motor exhaust fluid through the service line to the service passage, said valve member being urged by a spring toward a normally inactive position but being actuatable out of said position in a direction to restrict return flow of motor exhaust fluid through said service line to the service passage under force exerted on the valve member counter to the force of its spring;

C. means for monitoring the pressure of fluid present in the service passage and rendered operative by the valve element in said metering positions thereof to translate said monitoring pressure into said actuating force on the valve member whenever said monitored pressure rises to a predetermined value above that of fluid in the return passage means;

D. and means rendered operative by supply fluid pressure, in said first operating position of the valve element, for assuring substantially free flow of pressure fluid through the service line to a fluid motor connected therewith.]

[7. The valve instrumentalities of claim 6 wherein said last named means comprises:

A. means defining a piston connected with said valve member and which can be held by fluid pressure force in a position blocking movement of the valve member toward its active position;

B. and means for translating pressure of supply fluid into said force on the piston.]

[8. The valve instrumentalities of claim 6, wherein said last named means comprises:

A. a passage connecting with the service passage and through which supply fluid can flow in bypass relation to said valve member in said first operation position of the control valve element;

B. and a check valve in said bypass passage to block flow of exhaust fluid therethrough to the return means in said second operating position of the control valve element.]

[9. The valve instrumentalities of claim 6, further characterized by:

A. said pressure reducing valve mechanism comprising a pair of chambers, one of which is communicated with said service passage to be pressurized by motor exhaust fluid therein;

B. said valve member having portions disposed in said chambers, and being movable toward an active position restricting said passageway in response to pressure of motor exhaust fluid in said one chamber;

C. and means venting the other of said chambers.]

[10. The combination of claim 9, wherein said last named means comprises a vent line at all times connecting said other chamber with pressure fluid supply passage means in the control valve.]

[11. The combination of claim 9, wherein said venting means communicates with the pressure fluid supply passage means in the control valve.]

[12. The combination of claim 9, wherein said venting means comprises a duct at all times communicated with the fluid return means.]

[13. The combination of claim 9, wherein said venting means comprises a duct which communicates with the pressure fluid supply passage means in the control valve and further comprises a passage in the control valve element effective only in the hold position thereof to communicate the pressure fluid supply passage with the fluid return means.]

[14. The combination of claim 9, wherein said venting means comprises a duct communicating said other chamber with the pressure fluid supply passage means, and wherein passage means in the control valve element communicates the pressure fluid supply passage means with the return means in the hold position of the valve element.]

*15. Valve instrumentalities for governing flow in a service line connectable with a fluid motor of pressure fluid to the motor and return fluid therefrom, said valve instrumentalities being of the type comprising a directional control valve having a service passage for connection with the service line to form a part thereof, fluid supply passage means, return passage means, and a valve element movable from a hold position blocking communication between the service passage and both of said passage means to a pair of operating positions, in one of which the service passage is communicated with the fluid supply passage means and in the other of which the service passage is communicated with the return passage means, through a range of metering positions at which the valve element restricts flow of fluid between the service passage and a passage means to an extent that decreases with movement of the valve element towards an operating position, said valve instrumentalities comprising:*

*A. a pressure reducing valve mechanism for said service passage*

*(1) having a single passageway through which all fluid that flows in said service line must pass,*

*(2) having a valve member movable in one direction to an open position and movable in the opposite direction to a restricting position throttling flow of fluid through said passageway, said valve member being arranged to be urged in said opposite direction with a force that depends upon pressure of fluid in the service passage,*

*(3) a chamber separate from said passageway, and*

*(4) means responsive to pressure of fluid in said chamber and operatively associated with the valve member for imposing a biasing force on said valve member that is in said one direction and of a magnitude that depends upon pressure of fluid in said chamber and is sufficient to maintain the valve member in its open position when fluid pressure in the service passage does not exceed pressure of fluid in said chamber; and*

*means at all times communicating said chamber with the fluid supply passage means, so that said valve member is held in its open position whenever pressure fluid is flowing from the pressure fluid source to the motor through the service passage.*

*16. The valve instrumentalities of claim 15, further characterized by:*

*C. means at all times imposing upon said valve member a biasing force in said one direction that is of substantially constant magnitude and is in addition to the biasing force imposed upon said means responsive to pressure of fluid in said chamber, so that movement of the valve member in said opposite direction requires that the biasing force exerted on the valve member by fluid in the service passage exceed the sum of the forces in said one direction.*

*17. The valve instrumentalities of claim 15, further characterized by:*

*C. means operative in the hold position of said valve element for communicating the fluid supply passage means with the return passage means, for venting of said chamber when the valve element is moved to its hold position.*

*18. The valve instrumentalities of claim 17, further characterized by:*

*D. said valve element and said valve member being so arranged that in the restricting position of the latter leakage of return fluid thereacross does not exceed leakage of return fluid from the service passage to the return passage means across the valve element in its hold position.*

*19. The valve instrumentalities of claim 15, wherein there is a second service line connectable with a fluid motor to provide for reversible actuation of the same and the directional control valve has a second service passage for connection with said second service line to form a part thereof, further characterized by:*

*C. a second pressure reducing valve mechanism for the second service passage, substantially identical to said*

*first mentioned pressure reducing valve mechanism; and*

*D. means at all times communicating the chamber of the second pressure reducing valve mechanism with the fluid supply passage means, to enable the two pressure reducing valve mechanisms to cooperate for coordination of fluid flows through the respective service lines.*

*20. Valve instrumentalities for governing operation of a fluid motor, characterized by:*

*A. a control valve having a pair of service passages for connection with the opposite sides of a fluid motor, and a valve element movable through a number of metering positions to full flow operating positions concurrently communicating either of the service passages with pressure fluid supply means and the other service passage with fluid return means in the valve, from a hold position closing off said service passages from the fluid supply and return means;*

*B. a pressure reducing valve mechanism for each service passage, having a passageway through which exhaust fluid from the governed motor flows to the fluid return means through the associated service passage and through which same passageway supply fluid from the pressure fluid supply means must flow to reach the governed motor, each of said pressure reducing valve mechanisms having a chamber separate from said passageway but communicated with the pressure fluid supply means and further having a pressure responsive valve member actuatable in a direction to restrict the passageway to an extent depending upon the pressure of motor exhaust fluid in the associated service passage whenever the pressure of said exhaust fluid exceeds that of fluid at the pressure fluid supply means during times the valve element is in one of said metering positions, to thereby maintain the pressure of exhaust fluid in the associated service passage at a substantially uniformly low value above that of fluid in the return means;*

*C. and means located in said chamber of each pressure reducing valve mechanism operatively connected with the valve member thereof and rendered operative in response to pressure of supply fluid in said chamber for preventing movement of said valve member in said direction when fluid pressure in the associated service passage does not exceed that of fluid at the pressure fluid supply means, to thus permit flow of supply fluid through the associated service passage to the governed motor substantially without interference from said pressure reducing valve mechanism.*

*21. The combination of claim 20, wherein said last named means comprises a plunger which is connected with said valve member and which operates in said chamber to be biased by pressure of supply fluid therein towards a position preventing movement of said valve member in said direction.*

*22. Valve instrumentalities for governing flow of pressure fluid to and from a fluid motor via a service line connectable therewith, characterized by:*

*A. a directional control valve having fluid supply and return passage means, a service passage for connection with the service line to form a part thereof, and a valve element movable from a hold position to first and second operating positions to respectively communicate the service passage with the fluid supply and return passage means, said valve element being movable through a range of metering positions to provide for return flow of motor exhaust fluid from the service passage to the return passage means in an amount which increases with movement of the valve element toward said second position thereof and reaches maximum thereat;*

*B. a pressure reducing valve having*

*(1) a pair of chambers, and*

*(2) a valve member to regulate flow of motor exhaust fluid through the service passge, said valve member having opposing portions respectively disposed in said chambers and being urged by a spring in one direction toward a normally inactive position but being movable in the opposite direction toward an active position restricting return flow of motor exhaust fluid through said service line to the service passage;*

*C. monitoring means rendered operative by the valve element in said metering positions thereof to translate pressure of fluid present in the service passage into a force on the valve member that moves it in said opposite direction whenever pressure of fluid in said service passage exceeds that of fluid in the return passage means by more than a predetermined difference, said monitoring means comprising means communicating one of said chambers with said service pasage; and*

*D. communication means comprising duct means by which the other of said chambers is at all times communicated with the fluid supply passage means in the control valve, said communication means being rendered effective to vent said other chamber in consequence of the valve element of the directional control valve being in its hold position, and being rendered operative by fluid pressure in the supply passage means when the valve element is in its first operating position to pressurize said other chamber and thus maintain the valve member in its inactive position at which said valve member allows substantially free flow of pressure fluid through the service line to a motor connected therewith.*

*23. The valve instrumentalities of claim 22 wherein said communication means further comprises a passage in the control valve element effective only in the hold position thereof to communicate the fluid supply passage means with the return fluid passage means.*

*24. Valve instrumentalities for governing flow of pressure fluid to and from a fluid motor via a service line connectable therewith, characterized by:*

*A. a directional control valve having fluid supply and return passage means, a service passage for connection with the service line to form a part thereof, and a valve element movable from a hold position to first and second operating positions to respectively communicate the service passage with the fluid supply and return passage means, said valve element being movable through a range of metering positions to provide for return flow of motor exhaust fluid from the service passage to the return passage means in an amount which increases the movement of the valve element toward said second position thereof and reaches maximum thereat;*

*B. a pressure reducing valve having*

*(1) a pair of chambers, and*

*(2) a valve member to regulate flow of motor exhaust fluid through the service passage, said valve member having opposite portions respectively disposed in said chambers and being urged by a spring in*

*one direction toward a normally inactive position but being movable in the opposite direction toward an active position restricting return flow of motor exhaust fluid through said service line to the service passage;*

*C. monitoring means rendered operative by the valve element in said metering positions thereof to translate pressure of fluid present in the service passage into a force on the valve member that moves it in said opposite direction whenever pressure of fluid in said service passage exceeds that of fluid in the return passage means by more than a predetermined difference, said monitoring means comprising means communicating one of said chambers with said service passage;*

*D. communication means at all times communicating the other of said chambers with the fluid supply passage means in the control valve, to pressurize said other chamber from fluid pressure in the supply passage means when the valve element is in its first operating position and thus maintain the valve member in its inactive position at which said valve member allows substantially free flow of pressure fluid through the service line to a motor connected therewith; and*

*E. duct means rendered operative to vent said other chamber in consequent of the valve element of the directional control valve being in its hold position.*

*25. The valve instrumentalities of claim 24 wherein said duct means comprises a passage in the control valve element effective only in the hold position thereof to communicate the fluid supply passage means with the return fluid passage means.*

* * * * *